United States Patent Office 2,832,721
Patented Apr. 29, 1958

2,832,721
VITAMIN EMULSIONS

Robert Rudolf Degkwitz, New York, N. Y., assignor to Merck & Co., Inc., Rahway, N. J., a corporation of New Jersey No Drawing. Continuation of application Serial No. 275,669, March 8, 1952. This application July 23, 1956, Serial No. 599,288

4 Claims. (Cl. 167—81)

This invention relates to vitamin emulsions and procedures for preparing same. More particularly, the invention relates to new emulsions of the oily vitamins and the manner of preparing the same to provide preparations suitable for intravenous injection. This application is a continuation of my pending application Serial No. 275,669, filed March 8, 1952, now abandoned.

While it has heretofore been possible to administer the water soluble vitamins by injection, practical procedures for injecting water insoluble vitamins such as vitamins A, D, E and $K_1$, hereinafter referred to as the oily vitamins or oil-soluble vitamins, have not been available.

I have now discovered in accordance with the present invention that emulsions of the oily vitamins can be prepared which have properties and characteristics adapting them for administration by intravenous injection, and which have the further advantage of being extremely stable under conditions normally encountered in storage and handling. These emulsions which contain oily vitamin as the dispersed phase in water containing lecithin as an emulsifying or stabilizing agent, derive their characteristic stability from the manner of bringing together the various components and combining these components to form the emulsion.

Regarded in certain of its broader aspects, my invention comprises stable oily vitamin emulsions suitable for intravenous injection, and the preparation thereof by combining an organic solvent solution containing lecithin with a solution of oily vitamin in a lower aliphatic alcohol, then combining this mixture with water, while subjecting the mixture to rapid agitation, continuing the rapid agitation while the temperature of the mixture rises from about room temperature to about 43–45° C., and then removing the organic solvents from the resulting emulsion by partial evaporation under vacuum. It should be noted, however, that it is the preparation of a solution of oily vitamin and lecithin in the mixed organic solvent and the emulsification of such mixed organic solvent solution in water, which imparts the characteristic stability to my emulsions; and that the steps of separately dissolving the oily vitamin and lecithin in different solvents, while representing a preferred manipulative procedure, are not essential to the process.

In carrying out the process of my invention, a solution of the oily vitamin to be emulsified is prepared by dissolving the same in a lower aliphatic alcohol. I preferably employ propanol or isopropanol since these alcohols provide an optimum combination of solubility for oily vitamin and ease of evaporation from the completed emulsion. Other alcohols can be used, but higher alcohols cannot be so readily removed by evaporation from the completed emulsion, and lower alcohols, being poorer solvents for the oily vitamins, must be employed in excessively large amounts.

The oily vitamins can be employed singularly and in compatible combination to provide stable emulsions having the properties or combination of properties desired in various preparations for intravenous injection.

The alcohol solution of oily vitamin is then combined with a solution of lecithin in an organic solvent which is also a solvent for the vitamin to be emulsified. This solvent acts both to dissolve the lecithin and to increase the dispersibility of the oily vitamin in water during emulsification. I prefer to use chloroform as the solvent for dissolving lecithin, but other solvents can be used for this purpose, including particularly ethyl ether and petroleum ether. In this connection, the solvent employed should be one which is easily removed after formation of the emulsion by evaporation under vacuum.

While lecithin can be obtained from various sources I have found that soy bean lecithin and egg lecithin give the best results in preparing my stable vitamin emulsions. These lecithins are physiological substances which can be intravenously injected without adverse affect in the amounts contemplated in my vitamin emulsions and have the further advantage of being unaffected by autoclaving of the completed emulsion.

The lecithin-vitamin-solvent mixture is then stirred with water in an amount preferably equivalent to about one-and-one-half to two times the aggregate amount of vitamin and solvent. The stirring is effected by a high speed mechanical stirrer operating at 8000–9000 revolutions per minute and is continued for a period of time required to elevate the temperature of the mixture from about room temperature to about 43–45° C. The stirring speed and the temperature at which stirring is stopped appear to be primary factors in obtaining a stable emulsion. If stirring is stopped before reaching a temperature of 43–45° C., the particle size of the dispersed phase may be too large to provide a stable emulsion, whereas continuing the stirring until the temperature substantially exceeds 45° C. may result in a particle size too small for optimum stability.

After stirring the emulsion until a temperature of about 43–45° C. is reached, the resulting emulsion is cooled to about 5° C. and then subjected to low pressure evaporation at a pressure of 1–5 mm. mercury and at temperatures ranging from an initial temperature of about 15–20° C. to a final temperature of about 45–50° C. The evaporation is advantageously carried out in two stages, the initial stage requiring about half the total evaporation time being conducted at a temperature of about 15–20° C. and effecting a removal of about 80 percent of the organic solvents. In the second stage, the temperature is gradually elevated to 45–50° C. and evaporation continued until emulsion is free of chloroform and other organic solvents. During the evaporation, a substantial quantity of water is also removed and the completed emulsion must generally be adjusted to the desired concentration by addition of water.

It has been found that addition of water at this stage or before the evaporation is started does not impair the stability of the final emulsion. In fact it is frequently advantageous, after initial emulsion formation by stirring until a temperature of 43–45° C. is reached, to add a quantity of water at a temperature of about 40–45° C. while stirring the emulsion in order to provide a substantial excess of water during the evaporation step. This addition of water does not alter the particle size of the dispersed piece but serves to prevent undue concentration of the emulsion during the evaporation step. In diluting the emulsion as above described, a quantity of water equivalent to the total volume of the emulsion can be employed.

The most stable emulsions are those in which the dispersed particles have a diameter within the range of about 0.1–0.5 micron. This particle size in the dispersed phase also provides an emulsion which may be injected intravenously without difficulty. An important factor in the control of particle size is the manner of mixing by high speed stirring as above described.

The size of the dispersed particles will also depend in part upon the relative volumes of oily vitamins, organic solvents, and water subjected to mechanical agitation. As previously pointed out, the quantity of water employed in forming the emulsions should preferably be about one-and-one-half to two times the aggregate amount of oily vitamin and organic solvents. By way of illustration, stable emulsions of oily vitamins can be prepared when the volume ratios of oily vitamin-organic solvents-water are within the range of 1:1:2 to about 1:5:12 with an optimal ratio of about 1:5:9. It is preferred not to use a total volume of organic solvents less than the amount of oily vitamin to be emulsified, as the mixture becomes unduly viscous and difficult to emulsify.

Increasing the proportion of organic solvents to oily vitamin produces a less viscous mixture which is more readily emulsified, but increasing the proportion beyond about five parts of organic solvents to each part of oily vitamin serves no useful purpose in the emulsification step, while at the same time introducing a problem of removing an excessive amount of organic solvents from the completed emulsion.

Of the total quantity of organic solvents employed, approximately one-third is preferably chloroform or other solvent for the lecithin, while approximately two-thirds is isopropanol or other lower alkyl alcohol which is a solvent for the oily vitamin. It should be noted that these proportions can be varied, particularly as the relative amounts of lecithin and oily vitamin are varied. With smaller amounts of lecithin, the chloroform or other lecithin solvent may comprise as little as one-fourth of the total quantity of solvents, or as the amount of lecithin is increased, the quantity of chloroform may be as much as one-half the total quantity of organic solvents.

The preferred ratio of lecithin to oily vitamin is about one-two parts lecithin to five parts of the oily vitamin. Thus, in preparing vitamin emulsions of about five percent vitamin concentration, i. e., a concentration generally suitable for administration by injection, the lecithin will constitute only about one to two percent of the emulsion. The amount of lecithin introduced in normal dosages of 1–3 cc. of oily vitamin emulsions is insufficient to produce adverse side effects.

Since my emulsions are intended primarily for parenteral injection, it will be understood that appropriate steps should be taken to assure that the products are sterile and also that they are substantially free of pyrogens. In this connection, it will be noted that the emulsions are not adversely affected by extended heating at 120° C. and that sterilization can therefore be effected by autoclaving. As for the control of pyrogen content, this is best carried out by employing pyrogen-free components in making the initial emulsion and carrying out successive steps under essentially pyrogen-free conditions.

The following examples will show how procedures for preparing my stable vitamin emulsion can be carried out but it will be understood that these examples are given by way of illustration and not by limitation.

Example 1

A 100 gram portion of soya bean lecithin was treated with 500 cc. of ethyl ether and centrifuged in order to remove denatured proteins and other insoluble material. Approximately one liter of acetone was slowly added to the ether solution and after 24 hours' standing the solvents were decanted from the precipitated lecithin. The precipitate was further washed twice by decantation with one-liter portions of acetone, decantation following 24 hours' standing in each case. The lecithin was filtered and dried in vacuo at room temperature. This purification procedure reduces the pyrogen content below 0.05 unit per 60 milligrams.

Ten grams of purified lecithin containing not more than 0.05 pyrogens unit per 60 milligrams of lecithin was dissolved in 90 cc. of chloroform in a 2-liter beaker. To this solution was first added 50 grams of vitamin $K_1$ dissolved in 170 cc. of isopropanol, and then 450 cc. of pyrogen-free distilled water at 23° C. The mixture was then stirred by means of a small mechanical stirrer at 8000–9000 revolutions per minute. The temperature rose gradually during stirring. When the temperature reached about 45° C., 730 cc. of water was added and stirring continued for approximately five minutes. Temperature of added water was 40–45° C.

Evaporation of the emulsion to remove the organic solvents was accomplished in a long-tube evaporator. The emulsion was cooled to 5° C. and evaporation in the long-tube evaporator allowed to proceed at a pressure of 1–5 mm. of mercury. The temperature of the circulating water in the evaporator at the beginning was 15–20° C. The initial stage of the evaporation process, during which approximately 80 percent of the solvents were removed, required approximately one-half hour. The temperature of the circulating water was then slowly raised to 45–50° C. and evaporation continued (approximately one-half hour) until the emulsion was found to be free of chloroform. During the evaporation, in addition to the removal of chloroform and isopropanol, approximately 200 cc. of water was removed. A measurement of the volume of emulsion after the concentration step indicates the amount of water to be added at this point, to provide a final emulsion having a five percent vitamin concentration (or other concentration as may be desired). The required additions of water can be made at this point without fear of altering the emulsion stability.

Chemical stability and emulsion stability are not impaired by exposure of the emulsion to a temperature of 120° C. for two hours, sufficient to sterilize by autoclaving.

Example 2

The procedure as described in Example 1 was repeated using in place of vitamin $K_1$, 50 grams of vitamin $K_1$ oxide (2-methyl-3-phytyl-1,4-nephthoquinone-2-3-oxide, a colorless oil somewhat more stable than $K_1$ but having the same physiological activity as $K_1$) and resulted in a stable emulsion which was not adversely affected by heating at a temperature of 120° C. for a two-hour period.

Example 3

The procedure as described in Example 1 was repeated using in place of vitamin $K_1$, 50 grams of vitamin A; the stable emulsion thereby obtained was not adversely affected by heating at a temperature of 120° C. for two hours.

In addition to the foregoing, it has been found that stable emulsions of vitamin D and vitamin E can be prepared by employing the procedure as described in example 1, merely substituting 50 grams of vitamin D and vitamin E, respectively, for the vitamin $K_1$ referred to therein.

In addition to the advantage of not being adversely affected by extended periods of heating at 120° C., it should be noted that my vitamin emulsions have been stored for extended periods of time at room temperature and under refrigeration without showing any loss of stability. In addition, they have been shipped by train and truck and subjected to the normal rough handling of commerce without affecting the physical stability of the emulsions.

Various changes and modifications in the procedures herein described may occur to those skilled in the art, and to the extent that such changes and modifications fall within the purview of the appended claims, it is to be understood that they constitute part of my invention.

I claim:
1. The process for preparing a stable aqueous emulsion of vitamin $K_1$ for intravenous injection that comprises preparing a solution of vitamin $K_1$ in isopropanol, mixing this solution with a solution of lecithin in chloroform in proportions to provide in the mixed organic solvent solution about 1 part of lecithin to each 5 parts of vitamin $K_1$, mixing the organic solvent solution with about 1.5 to 2 times its volume of pyrogen free water and rapidly stirring the resulting mixture to effect emulsification, continuing the rapid stirring until dispersed particles in the emulsion are predominately of a diameter within the range of 0.1 to 0.5 micron, and removing the organic solvents from the resulting emulsion by low pressure evaporation.

2. The process for preparing a stable aqueous emulsion of vitamin $K_1$ for intravenous injection that comprises preparing a solution of lecithin and vitamin $K_1$ in the proportions of about 1 part by weight of lecithin for each 5 parts by weight of vitamin $K_1$ in an organic solvent mixture of chloroform and isopropanol in which about 1 to 4 parts by volume of isopropanol is present for each part by volume of chloroform, mixing the said organic solvent solution with about 1.5 to 2 times its volume of pyrogen free water, rapidly stirring the resulting mixture to effect emulsification, continuing the rapid stirring until dispersed particles in the emulsion are predominately of a diameter within the range of 0.1 to 0.5 micron, and removing the organic solvents from the resulting emulsion by low pressure evaporation.

3. The process for preparing a stable aqueous emulsion of vitamin $K_1$ for intravenous injection that comprises preparing a mixture of lecithin and vitamin $K_1$ in the proportions of about 1 part by weight of lecithin for each 5 parts by weight of vitamin $K_1$, in an organic solvent mixture of chloroform and isopropanol in which about 2 parts by volume of isopropanol is present for each part by volume of chloroform, mixing the said organic solvent solution with about 1.5 to 2 times its volume of pyrogen free water, rapidly stirring the resulting mixture to effect emulsification, continuing the rapid stirring until dispersed particles in the emulsion are predominately of a diameter within the range of 0.1 to 0.5 micron, removing the organic solvents from the resulting emulsion by low pressure evaporation, and thereafter diluting with pyrogen free water for adjustment of the vitamin $K_1$ concentration to the concentration desired for intravenous injection.

4. A stable aqueous emulsion of vitamin $K_1$ for intravenous injection obtained by the process as defined in claim 2 and further characterized as comprising vitamin $K_1$, an emulsifying agent consisting of lecithin, and water and as having particles of vitamin $K_1$-lecithin mixture as the dispersed phase, said particles being predominately of a diameter within the range of 0.1 to 0.5 micron, and the lecithin being present in the amount of about 1 part for each 5 parts by weight of vitamin $K_1$.

References Cited in the file of this patent

Shoshres: Jour. of Laboratory and Clinical Med., vol. 36, October 1950, pp. 531–536.